US006540918B2

(12) United States Patent
Gil et al.

(10) Patent No.: US 6,540,918 B2
(45) Date of Patent: Apr. 1, 2003

(54) HYDROCYCLONE SEPARATOR

(75) Inventors: Shmuel Gil, Kfar Saba (IL); Joshua Belogorodsky, Tel Aviv (IL)

(73) Assignee: Odis Irrigation Equipment Ltd., Petach Tikva (IL)

( * ) Notice: Subject to any disclaimer, the term of this patent is extended or adjusted under 35 U.S.C. 154(b) by 90 days.

(21) Appl. No.: 09/758,762

(22) Filed: Jan. 11, 2001

(65) Prior Publication Data

US 2001/0002009 A1 May 31, 2001

Related U.S. Application Data

(63) Continuation of application No. PCT/IL99/00383, filed on Jul. 13, 1999.

(30) Foreign Application Priority Data

Jul. 14, 1998 (IL) ............................................... 125335

(51) Int. Cl.[7] ................................................ B01D 21/26

(52) U.S. Cl. ........................ 210/512.1; 55/428; 55/435; 55/459.1; 200/719; 200/720; 200/725; 200/733

(58) Field of Search .......................... 210/512.1, 512.2, 210/788; 209/719, 720, 725, 733; 55/435, 428, 459.1

(56) References Cited

U.S. PATENT DOCUMENTS

| | | | | | |
|---|---|---|---|---|---|
| 2,534,702 | A | | 12/1950 | Driessen | |
| 2,897,972 | A | * | 8/1959 | Cannon | 220/512.1 |
| 4,308,134 | A | | 12/1981 | Lilleker et al. | |
| 4,541,934 | A | | 9/1985 | Hakola | |

FOREIGN PATENT DOCUMENTS

| | | |
|---|---|---|
| GB | 607777 | 6/1949 |

* cited by examiner

*Primary Examiner*—David A. Reifsnyder
(74) *Attorney, Agent, or Firm*—Harness Dickey & Pierce PLC

(57) ABSTRACT

A hydrocyclone separator comprising a truncated cone-shaped vessel having a tangential fluid stream inlet, a fluid stream outlet, a solid particle collector and a conical insert removably mounted between the truncated cone-shaped vessel and the solid particle collector, said conical insert comprising an erosion resistant material.

18 Claims, 1 Drawing Sheet

HYDROCYCLONE SEPARATOR

This application is a continuation of previously filed PCT application Serial No. PCT/IL99/00383, filed Jul. 13, 1999.

The present invention relates to hydrocyclone separators and particularly to such separators for purifying liquid streams by removing solid particulate matter, such as sand, dust and other undesirable solid particles present in the liquid stream.

BACKGROUND OF THE INVENTION

Hydrocyclone separators generally have the shape of a cone-shaped chamber having a tangential inlet duct, an upper fluid outlet and a bottom solid particle collector. A fluid stream is introduced through the inlet duct and flows spirally downwards the conical wall while increasing the spin velocity as it descends. Solid particles in the fluid such as sand or dirt are thrown against the wall of the chamber by centrifugal force resulting from the spiral rotation and are discharged at the outlet, at the bottom of die cone, into a collection chamber while the purified liquid moves upwards, at the center of die spiral, towards the outlet at the top of the chamber. Hydrocyclones are usually made of metal such as steel although stainless steel can also be used but it is rather expensive. A major problem with the hydrocyclone separators currently available is that as the solid particles increase their speed during their descent down the cone shaped wall, they increase the pressure and friction on die cone wall resulting in the erosion and abrasion of the metal wall. This is most evident near the bottom of the cone. The force of the particles as they scrape against the wall of die chamber varies, of course, depending on their concentration, hardness and sharp edges. Thus the bottom cone section, which takes die hardest beating, is often worn through until there are holes. Because of this erosion, the hydrocyclone separators frequently need repair, giving them a limited continuous life. When the erosion becomes severe enough, the whole unit is often replaced or dismantled and sent away for repair, or it is repaired on the spot by cutting away the cone bottom and welding on in its place another cone section or adding a patch by welding. During this repair period, which can take some time, the liydocyclone is out of service. For many applications the hyrdocyclone is used in the field away from maintenance shops and other repair facilities. In these cases tie problem of repairing hydrocyclones with eroded bottoms can be quite serious and expensive.

DESCRIPTION OF THE INVENTION

It is an object of the present invention to provide a new hydrocyclone separator giving greater resistance to erosion.

Another object of the present invention is to provide a hydrocyclone separator that can be repaired quickly when erosion does occur.

A further object of the invention is to provide a hydrocyclone separator having exchangeable conical bottom inserts.

A still further object of the invention is to provide a bottom insert for a conical hydrocyclone.

In accordance with the invention there is provided a hydrocyclone separator comprising a truncated cone-shaped vessel having a tangential fluid stream inlet, a fluid stream outlet, a solid particle collector and a conical insert removably mounted between the truncated cone-shaped vessel and the solid particle collector, said conical insert comprising an erosion resistant material.

The conical insert can be mounted between the truncated cone-shaped section of the vessel by means of mating flanges bolted or clamped together. The insert may be comprised of hard metal, metal oxide, hard rubber, or other synthetic abrasion resistant material. Alternatively, the insert may comprise a hard outer shell having an abrasion resistant inner lining which may be integral with the outer shell or merely supported by it.

In one preferred embodiment, the erosion resistant inner liner is a discrete separate unit that is supported by the insert and is easily replaceable when necessary.

Since the hydrocyclone separator of this invention comprises a removeable erosion resistant insert, any erosion occurring in the lower conical section will take place in the insert and can be dealt with quickly by exchanging the entire worn insert, or replacing the abrasion resistant liner with a new one. Preferably, the insert is mounted between two flanges connecting the body of the hydrocyclone with the precipitation collector without requiring special equipment, welding or other special complicated connecting means. Because the insert is lined or coated with an anti-erosion liner or coating, the down-time of tie hydrocyclone is substantially decreased.

The specific shape and cone angle of the insert can vary and may be designed to maximize the separation capabilities of the hydrocyclone, depending on the nature and composition of the fluid stream, die pressure differential in the hydrocyclone, and/or the draining of solid particulate matter into the particle collector to which the hydrocyclone is attached.

DETAILED DESCRIPTION OF THE DRAWINGS

The invention will better be understood with reference to the drawings in which

DESCRIPTION OF THE PREFERRED EMBODIMENT

Figure 1:
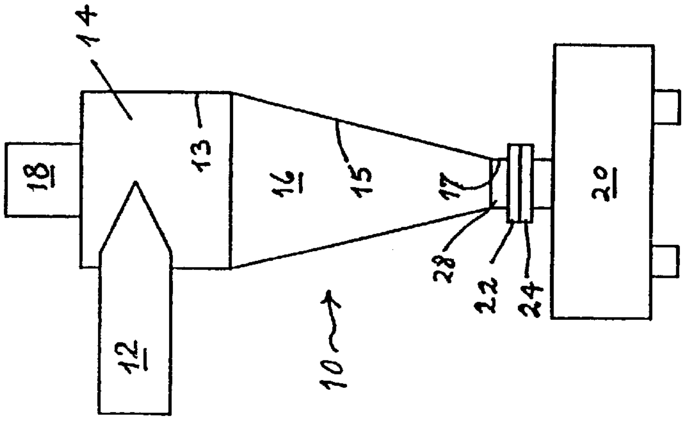
FIG. 1 illustrates a prior art hydrocyclone.
Figure 4D:
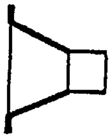
FIGS. 4*a* to 4*d* show different shape conical tip sections according to the present invention.
Figure 4C:
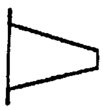
Figure 4B:
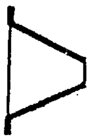
Figure 4A:
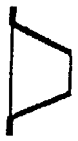

Referring now to FIG. 1, there is shown a prior art conventional hydrocyclone 10 comprising a tangential inlet pipe 12, a central cylindrical chamber section 14 with a conical section 16, a fluid exit tube 18, and a solid particle collector 20. From the conical section 16 extends a tubular section 28 having a terminal circumferential flange 22 which is mated to flange 24 of tube 26 extending from the particle collector 20. Polluted fluid containing sand or other solid particles is fed through the inlet pipe 12 into the cylindrical chamber 14 where it impinges on the wall 13 and is circulated around die wall 13 of the chamber 14. By force of gravity, the heavier particles within the flow stream are drawn downwards and continue their spiral descent down the wall 15 of the conical chamber 16 by virtue of the centrifugal force, and increase their speed as they descend to die particle collector 20 past the tube 28 at the end of the conical section 16. The bottom of the conical section 16 and its tubular tip 28 are subjected to a very high degree of the erosion because of the circulating particle that impinge on its walls 15 and 17 at high speed. Therefore, this section of the apparatus is subject to frequent erosion damage. In order to make repairs, the whole vessel may have to be transported to a repair station, which of course involves substantial effort and loss of utility for the time that the vessel is not in use. Alternatively, the bottom of the conical section 16 is cut off and a replacement section is welded on directly in the field, which also removes the apparatus from use while it is being repaired.

Figure 2:
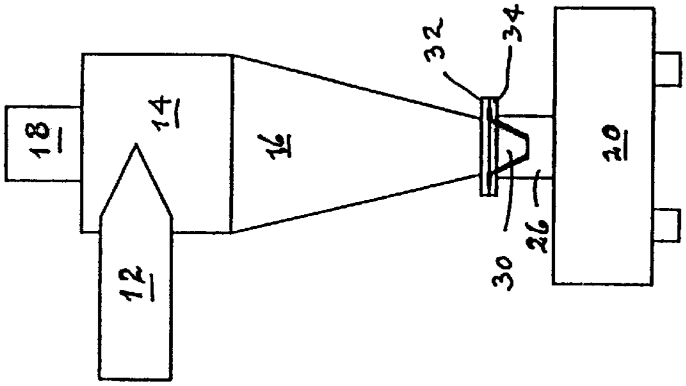
FIG. 2 illustrates a hydrocyclone in accordance with die present invention.

Referring now to FIG. 2, there is shown a hydrocylone 10, in accordance with the present invention. The hydrocyclone 10 has a conventional inlet pipe 12, an outlet tube 18, cylindrical body section 14 and conical chamber 16. However, the conical chamber 16 is truncated at its narrow end and has a circumferential flange 32 extending outward directly from this end. A particle collector 20 has an inlet tube 26 with a circumferential flange 34. The chamber 16 is connected to the collector 20 by mounting flange 32 on flange 34 with bolts, clips or other known means. However, in this case a metal conical insert 30 is placed between the conical section 16 and the inlet tube 26 of the particle collector 20, secured between the two mated flanges 32 and 34 by means of bolts or clips (not shown). This conical metal insert 30 can be made from, or lined with, erosion resistant material. The insert, furthermore, extends the cone-shape of the truncated cone section 16. Thus, insert 30 which is subject to the most erosion can easily be dismantled and replaced with a new insert by merely unbolting the flanges 32 and 34. The erosion resistant material for use as liner or coating for the insert can be hard rubber, oxidized metal such as aluminum, stainless steel or any other suitable abrasion resistant material. Because the insert 30 can readily be removed and replaced, the hydrocyclone separator 10 does not have to be transported away from the field or other location where it is operative, and replacing the insert is effected quickly with minimal time loss when the hydrocyclone is inoperative.

Figure 3:
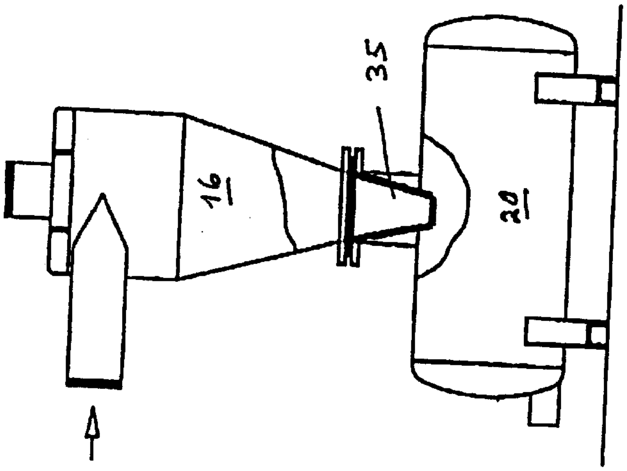
FIG. 3 shows another embodiment of a hydrocyclone according to the invention.

Referring now to FIG. 3, there is shown another embodiment of the present invention wherein the conical metal insert 35 is longer than tie insert 30 in FIG. 2. In this embodiment the insert 35 has smaller conical base angles and it enters the particle collecting container 20 directly.

FIGS. 4*a* to 4*d* illustrate different geometric configurations of conical inserts that can be mounted on to a hydrocyclone chamber giving it a broad range of applications. The criteria for determining the geometric configuration of the insert include among other things: percent of solids to be separated, type, size and specific gravity of particles and frequency of emptying the particle collector. The angle of the cone generally varies between 6 degrees and 40 degrees, and the insert will usually have the same angle as the conical section.

We have determined that the erosion within the hydrocyclone takes place in the lower ¼ to ⅛ section of the cone, and therefore, this section is best suitable for having the insert.

What is claimed is:

1. A hydrocyclone separator comprising:

a truncated cone-shaped vessel having a tangential fluid stream inlet and a fluid stream outlet, wherein an inlet tube detachably connects the truncated cone-shaped vessel to a solids particle collector; and a conical insert mounted between the truncated cone-shaped vessel and the inlet tube, wherein the inlet tube is of uniform diameter and the conical insert is erosion resistant and detachably mounted at its wide end with its tip unsupported and suspended within the free space of the inlet tube without direct or indirect contact with the inlet tube.

2. A hydrocyclone separator as in claim 1, wherein the insert is mounted between two flanges, one flange on the vessel and the other flange on the inlet tube.

3. A hydrocyclone separator as in claim 2, wherein the angle of the cone of the truncated cone-shaped vessel and the angle of the conical insert are between 6 degrees and 40 degrees.

4. A hydrocyclone separator as in claim 2, wherein the conical insert has a height of between ⅛ to ¼ of the cone shaped vessel.

5. A hydrocyclone separator as in claim 2, wherein the erosion resistant insert is made of rubber.

6. A hydrocyclone separator as in claim 1, wherein the angle of the cone of the truncated cone-shaped vessel and the angle of the conical insert are substantially the same.

7. A hydrocyclone separator as in claim 6, wherein the angle is between 6 and 40 degrees.

8. A hydrocyclone separator as in claim 7, wherein the conical insert has a height of between ⅛ to ¼ of the cone shaped vessel.

9. A hydrocyclone separator as in claim 4, wherein the erosion resistant insert is made of rubber.

10. A hydrocyclone separator as in claim 6, wherein the conical insert has a height of between ⅛ to ¼ of the cone shaped vessel.

11. A hydrocyclone separator as in claim 3, wherein the erosion resistant insert is made of rubber.

12. A hydrocyclone separator as in claim 1, wherein the conical insert has a height of between ⅛ to ¼ of the cone shaped vessel.

13. A hydrocyclone separator as in claim 5, wherein the erosion resistant insert is made of rubber.

14. A hydrocyclone separator as in claim 1, wherein the erosion resistant insert is made of rubber.

15. A hydrocyclone separator as in claim 1 wherein the erosion resistant insert is comprised of a conical outer shell and an erosion resistant inner liner.

16. An erosion resistant inner liner for a conical outer shell insert of a hydrocyclone separator as in claim 15.

17. An inner liner as in claim 16, comprised of erosion resistant material selected from rubber, metal and metal oxide.

18. An inner liner as in claim 16, wherein the angle of the conical outer shell is between 6 degrees and 40 degrees.

* * * * *